US005505570A

United States Patent [19]
Meyen

[11] Patent Number: 5,505,570
[45] Date of Patent: Apr. 9, 1996

[54] DEVICE ON HAND POWER TOOL FOR DRIVING TOOLS

[75] Inventor: Hans-Peter Meyen, Filderstadt, Germany

[73] Assignee: Robert Bosch GmbH, Stuttgart, Germany

[21] Appl. No.: 340,221

[22] Filed: Nov. 16, 1994

[30] Foreign Application Priority Data

Nov. 30, 1993 [DE] Germany .......................... 43 40 727.7

[51] Int. Cl.$^6$ .............................. B23B 45/16; B23B 51/02

[52] U.S. Cl. .............................. 408/58; 279/19.4; 279/20; 408/226

[58] Field of Search .......................... 279/19, 19.3–19.5, 279/75, 82, 904, 905, 20; 408/226, 58

[56] References Cited

U.S. PATENT DOCUMENTS 5,326,199 7/1994 Kleine et al. .......................... 279/19.3
5,375,950 12/1994 Schulz et al. ............................ 279/19

FOREIGN PATENT DOCUMENTS 2551125 4/1987 Germany .
3843465 6/1990 Germany .
4223518 1/1994 Germany .

*Primary Examiner*—Steven C. Bishop
*Attorney, Agent, or Firm*—Michael J. Striker

[57] ABSTRACT

A device on power tools for driving impact and/or drilling tools has a tool having a tool shaft provided with at least two drive grooves open toward a shaft end and at least one locking trough closed toward the shaft end, in which correspondingly a driver and a locking body of a tool receptacle engage. For increasing the driving, at least one axial formation is provided on a projection of the thicker portion of the tool shaft to a thinner insertion end of the tool at the end side for an additional driving, which axial formation cooperates with an axial formation, for example a tooth, of a driven part, for example an auxiliary strip, at the end side of the tool holder.

14 Claims, 1 Drawing Sheet

DEVICE ON HAND POWER TOOL FOR DRIVING TOOLS

BACKGROUND OF THE INVENTION

The present invention relates to a device on hand power tools for driving impact and/or drilling tools, as well as to a tool and tool holder to be used in such a device.

German document DE-OS 25 51 125 discloses a device in which a receiving opening of a tool holder has two opposite strip-shaped drivers which engage in corresponding drive grooves in a shaft of a tool which is used here. Moreover, two locking bodies located opposite to one another and offset relative to the drivers by 90° are provided. They radially engage in correspondingly arranged, elongated troughs in the tool shaft and therefore secure the axially displaceable tool against falling out or unintentional pulling out.

This insertion system for impact drills and hammer drills known as "SDS-plus" as well as the tool insertable in the tool holder is used for different power and therefore provide the required compatibility to different tools with a uniform shaft diameter of for example 10 mm as well as a correspondingly uniform receiving opening on the tool holder. This however has the disadvantage that with high power tools in corresponding high power machines during continuous operation with full loading, the drivers are substantially worn out since the torque transmission is performed here only through relatively small, opposite flanks of the drive grooves and the drivers.

SUMMARY OF THE INVENTION

Accordingly, it is an object of the present invention to provide a device on hand power tools for driving tools as well as a tool and a tool holder used in them, which avoid the disadvantages of the prior art.

In keeping with these objects and with others which will become apparent hereinafter, one feature of the present invention resides, briefly stated, in a device on a hand power tool for driving impact and/or drilling tools, in which in accordance with the present invention a shaft end of the tool insertable in a receiving opening has a projection to a thicker portion of the tool shaft located there with a greater diameter, and an axial formation is provided on the projection at the end side for an additional driving, which formation cooperates in rotary direction with an axial formation on an end side of a driven part of the tool holder.

In view of the fact the above mentioned tools with a so-called "SDS-plus" insertion and the shaft diameter as well as the diameter of the tool receptacle is predetermined and the compatibility must be maintained, the arrangement formed in accordance with the present invention for driving impact and/or drilling tools has the advantage that for a drilling and chiseling tool with a relatively thick tool shaft at their projection to thinner insertion end one formation or preferably two symmetrically oppositely located formations provide for an additional driving, in that at least one matching formation at the end side of the tool receptacle cooperates with the same in the rotary direction. Thereby even in high power machines and tool, the wear of the drivers is prevented.

In accordance with a further feature of the present invention, a tool is proposed, in which at least one axial formation is provided at the end side on the projection as an additional driver for tools with different shaft diameter and with a projection to a shaft insertion end with a uniform diameter.

Also, in accordance with the present invention a tool holder is provided which has at least one radially inwardly projecting tooth forming an additional driver at the end side of the tool receptacle.

The improved tool shaft with the above mentioned new features can be used not only with the tool holder specified hereinabove, but also for machines with a "SDS-plus" tool receptacle without affecting the latter, in other words is compatible. It is further advantageous that the axial locking of the tool by the improved driver is not affected but instead remains completely operative. Moreover, due to the additional driver the tool guidance in the tool holder is improved, which is especially advantageous during a lateral pressing back or lifting of the tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
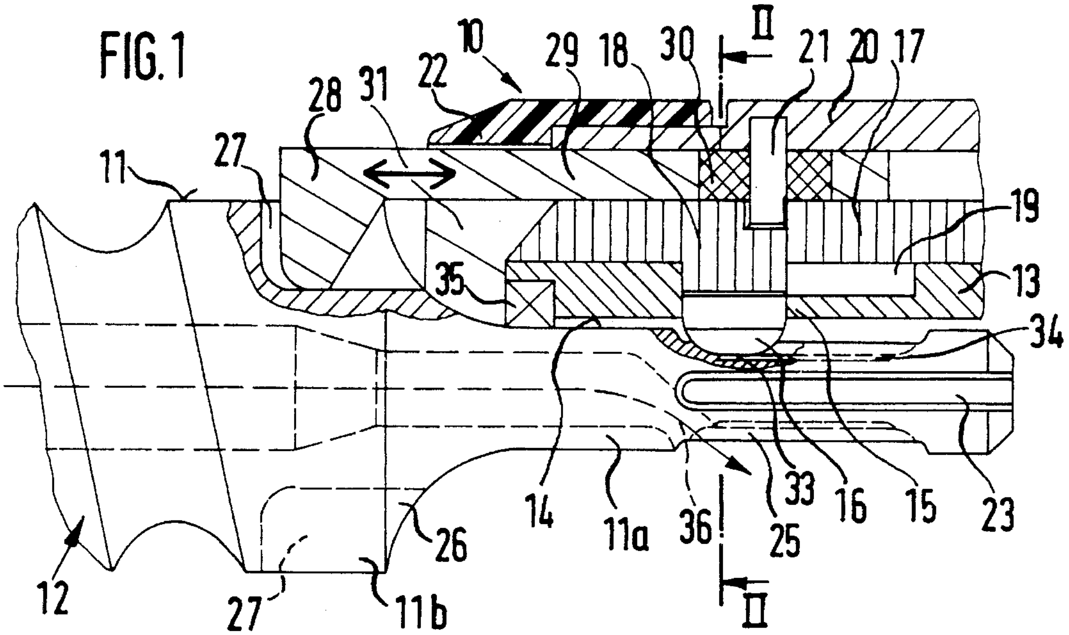
FIG. 1 is a view schematically showing an upper part of a tool holder of a hammer drill with an inserted impact drilling tool in a longitudinal section on an enlarged scale, in accordance with the present invention.

A device on power tools for driving impact and/or drilling tools, in particular impact drilling tools and hammer drills or impact devices has a tool holder identified with reference numeral 10 and an insertion end 11a of a tool shaft 11 of a tool 12 used for drilling and/or impacting. The insertion end 11a is inserted in the tool holder 10.

Figure 2:
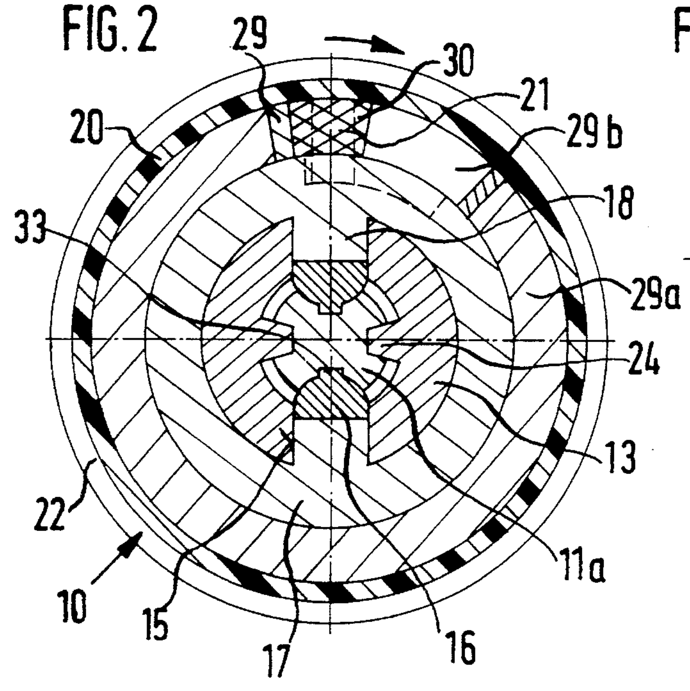
FIG. 2 is a view showing a cross-section of the tool holder taken along the line II—II in FIG. 1.
Figure 3:
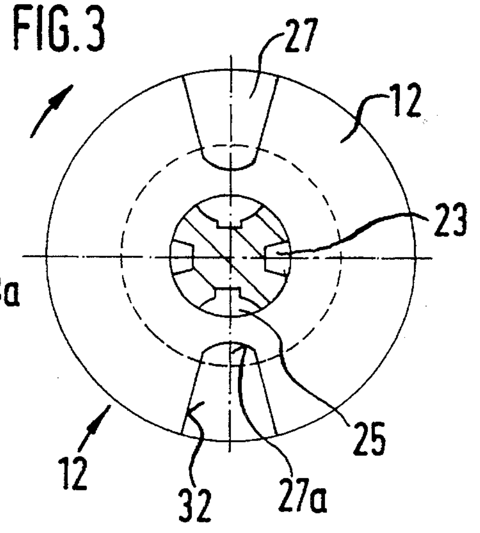
FIG. 3 is a view showing a cross-section through the impact drilling tool taken along the line II—II in FIG. 1.

In accordance with a first embodiment shown in FIGS. 1–3, the tool holder 10 is immovably mounted on an end of a driven, hollow cylindrical tool spindle of a known, not shown hammer drill. In FIG. 1 only the upper half of the tool holder 10 is shown in a cross-section, while the lower symmetrical half can be seen from FIG. 2. The tool holder 10 is composed of a tubular tool receptacle 13 with a receiving opening 14 for the insertion end *11a* of a tool 12 formed for example as an impact drill. Locking bodies 16 are located in two opposite throughgoing openings 15 of the tool receptacle 13 and each formed as an axially elongated body. An arresting sleeve 17 is arranged above the locking bodies 16 concentrically to the tool receptacle 13. The arresting sleeve 17 is arrested in its rest position by a not shown axially operating pressure spring in its shown rest position of the locking body 16.

The arresting sleeve 17 is supported in the tool receptacle 13 axially displaceably and provided above the locking bodies 16 with a radially inwardly extending projection 18 which ends above the corresponding locking bodies 16. During axial displacement of the arresting sleeve 17 this projection is displaceable in a recess 19 in the tool receptacle 13, so that the locking bodies 16 can deviate radially outwardly for insertion of the tool shaft 11.

An actuating sleeve 20 which is accessible from outside is connected with the arresting sleeve 17 through a pin 21 so that the arresting sleeve 17 carries the actuating sleeve 20 due to the axial pressing back. The actuating sleeve 20 is received at the front end in a protective cap 22.

At the insertion end 11a of the tool shaft 11, the tool 12 is provided with two opposite drive grooves 23 which are located opposite to one another and open toward the shaft end. Two drivers 24 which project inwardly in the receiving opening 14 and extend axially engage in the drive grooves 23 as can be seen in FIG. 2. The drivers 24 are offset relative to the locking bodies 16 in a peripheral direction of the tool receptacle 13 by 90°. Correspondingly, two opposite axially extending locking troughs 25 are offset in a peripheral direction of the tool shaft 11 relative to the drive grooves 23 of the tool shaft 11 by 90°. While the drive grooves 23 as well as the locking troughs 25 start at a substantially the same height on the shaft 11, the locking troughs 25 end before the rear end of the tool shaft 11, so that the locking bodies 16 engaging in them limit the axial movement of the tool 12 in the tool receptacle 13. After the insertion of this insertion end 11*a* of the tool 12 into the tool receptacle 13, the actuating sleeve 20 which has been withdrawn by hand is released and the above mentioned pressure spring presses the actuating sleeve 20 together with the arresting sleeve 17 again back to the shown rest position. The projection 18 arrests the associated locking body 16 in the arresting trough 25 of the tool shaft 11 radially, and the tool 12 is therefore secured against falling out or unintentional withdrawal.

For improving the driving, especially for tools with a great diameter of the working shaft 11*b* relative to the uniform shaft diameter of the insertion end 11*a*, a formation formed by two opposite radially outwardly open drive pockets 27 is provided at an end side in the projection 26 formed by a diameter extension. The tool holder 10 is provided with a radially inwardly projecting drive tooth 28 which is formed at the front end of the tool holder and cooperates with the above mentioned formation. The drive tooth 28 is located before the tool receptacle. In particular, it is located forwardly at the end side of an auxiliary strip 29 of the tool holder 10, which is arranged between the arresting sleeve 17 and the actuating sleeve 20 and guided in a sleeve part 29*a*. The auxiliary strip 29 together with the actuating sleeve 20 is rearwardly displaceable through the pin 21 and an insert member 30, so that the insertion end 11*a* of the tool 12 can be inserted into the tool receptacle 13. After the insertion, the drive tooth 28 is inserted axially forwardly into the aligned drive pocket 27 of the tool 12 when the actuating sleeve 20 is released.

The auxiliary strip 29 with the drive tool 28 is arrestably received in an axially pulled position on the tool holder 10 for small tools or for tools without drive pockets, whereby the actuating sleeve 20 is turnable relative to the arresting sleeve 17 between two arresting positions. Through the pin block 21 and the insert member 30, the auxiliary strip 29 is displaced in the machine in a direction of the longitudinal axis of the machine, the auxiliary strip 29 has a corresponding pin guide 29*b* which acts as a counter bearing and provided with arresting formations formed for example as a steep thread at the beginning of the thread and at the end of the thread for locking of the longitudinal movement. Alternatively, it can be arranged in the actuating sleeve 20, while then the insert member 30 is axially displaceable together with the auxiliary strip 29. One arresting position determines the engaging position of the drive tooth 28, while another arresting position determines the disengaging position. The drive tooth 28 in the disengaging position is inserted in a correspondingly arranged slot 31 of the protective cap 22, so that it no longer projects outwardly.

For preventing insertion in the inventive tool holder 10 of a drill of a different type, a radially projecting elongated cam 33 is formed at the inner side of the locking body 16 and engages in a correspondingly shaped longitudinal groove 34 at the bottom of the locking trough 25. During insertion of the tools of the different type without such longitudinal groove 34, the locking member 16 cannot be arrested or in other words the chuck of the tool holder 10 cannot be closed. Moreover, during the use of tools with an inner drillings aspiration, a suction opening 36 at the insertion end 11*a* can be located in the tool shaft 11 in the region of a not used locking trough 25 with available seal 35 on the receiving opening 14, as shown in FIG. 1 in a broken line.

For improving the driving, the drive pockets 27 are formed as deep as possible on the portion 11*b* of the tool shaft 11. Similarly to the toothed domes of the drive tooth 27 they can be located relative to the insertion end 11*a* of the tool 12 or the opening 14 of the tool receptacle 13 on a greater diameter, and thereby the engaging tooth 28 does not prevent the insertion of the shaft insertion end 11*a* into the tool holder 10.

Figure 4:
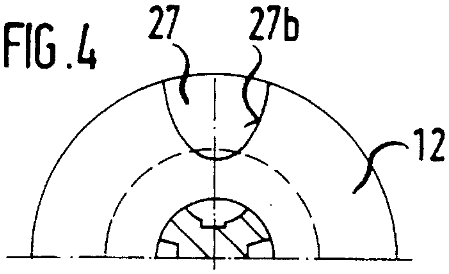
FIGS. 4 and 5 are views showing further embodiments of additional drivers on different tools.
Figure 5:
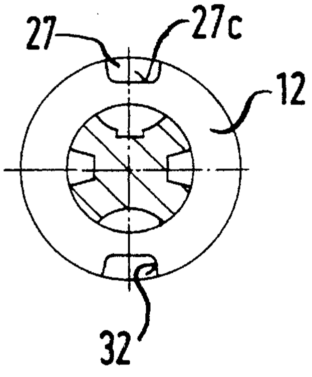

Further embodiments of the drive pockets are shown in FIGS. 4 and 5. The drive pockets 27 of the tool 12 shown in FIG. 3 have a cross-section which is wedge-shaped without a bottom 28*a* and straight, radially and axially extending flanks 32. In the embodiment of FIG. 4 the drive pockets 27 in the cross-section 27*b* are trough-shaped and rounded. Finally, in the embodiment of FIG. 5 the base 27*c* of the drive pockets 27 is flat. Since independently of the working shaft diameter 11*b* of the utilized tool, the pocket bottom is located always on the same diameter, in an advantageous manner with such an additional driving means, the radial depth of the drive pockets 27 increases with the diameter of the tool shaft 11, while the drive flank 32 cooperating with the drive tooth 28 in the rotary location is correspondingly increased.

The invention is not limited to the shown embodiments. Different shapes and arrangements for the formations on the tool or on the tool holder can be provided for forming an additional drive means. It is however important that in the rotary direction (in accordance with the arrow in FIG. 3) an abutment surface or flank increasing with the diameter of the insert 2 is provided with the driver at the end side of the tool holder. The dotted circle in FIGS. 3 and 4 shows the average diameter which is preferably used for the drive pockets. This diameter is approximately 16 mm. Instead of a rotary tooth 28 which is sufficient for small machines, it is recommended for a symmetrical loading to provide on medium heavy machines the arrangement of drive teeth located opposite to one another. For heavy machines it can be advantageous to provide three, four or more drive teeth, and naturally a corresponding number of the drive pockets 27 in the tool. Moreover, the drive pockets in weak tools can be machined in a thicker portion of the tool shaft.

Also, a reverse arrangement of the formations is possible as well. The drive pockets can be provided at the end side of the tool holder and brought in engagement with drive teeth on the tool shaft. Further, alternative solutions are also possible during the axial displacement of the auxiliary drive tooth 28 on the tool holder, in particular, structural solutions for converting the rotary movement into a longitudinal movement. Moreover, the longitudinal movement of the actuating sleeve 20 relative to arresting sleeve 13 superposed on the longitudinal displacement itself is possible for positioning the drive teeth. Further, by coding the locking trough 25 an automatic pretensioning and back tensioning of the drive tooth 28 during insertion of a tool can be performed.

It will be understood that each of the elements described above, or two or more together, may also find a useful application in other types of constructions differing from the types described above.

While the invention has been illustrated and described as embodied in a device on hand power tool for driving tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for driving impact and/or drilling tools in hand power tools, comprising a tool having a shaft with a shaft end; a tool holder having a tool receptacle for receiving said shaft of said tool, said tool having grooves which are open toward said shaft end while said tool holder has at least two axially extending drivers axially projecting in said tool receptacle and engaging in said grooves, said tool shaft having an elongated locking trough while said tool receptacle has a peripheral region which is offset relative to said drivers, said tool receptacle having a radial throughgoing opening which accommodates a locking body engaging in said locking trough so as to limit an axial movement of said tool in said tool receptacle, said shaft end of said tool inserted in said tool receptacle having a projection extending to a portion of said tool shaft having a greater diameter, said projection being provided at an end side with at least one first axial formation while a driven part of said tool holder has a second axial formation which cooperates in a rotary direction with said first axial formation to provide additional driving means, said second axial formation being axially driveable on said tool holder.

2. A device as defined in claim 1, wherein said drivers are located diametrically opposite to one another.

3. A device as defined in claim 1, wherein said formation of said tool shaft is formed as at last one radially outwardly open drive pocket formed in said thicker portion of said tool, said formation at said end side of said driven part of said tool holder being formed as a drive tooth which is axially offset relative to said tool receptacle and engages in said drive pocket.

4. A device as defined in claim 3, wherein said drive pocket has a pocket bottom and said drive tooth has a tooth dome which are located at a greater diameter relative to said insertion end of said tool and a receiving opening of said tool receptacle.

5. A tool for an arrangement for driving impact and/or drilling tools with a tool holder having a receiving opening with inwardly projecting and axially extending drivers and at least one radial throughgoing opening located in a peripheral region which is offset relative to the drivers and accommodating a locking body and also provided with at least one axial formation at an end side of a driven part of the tool holder, the tool comprising a tool shaft with grooves open toward a shaft end of the tool for receiving said drivers; an elongated locking trough provided in said tool shaft so that said locking member engages in said locking trough and limits a longitudinal movement of the tool in an axial direction; a projection located in said shaft which is insertable in the receiving opening and extending to a thicker portion of the tool shaft with a greater diameter so as to cooperate with the axial formation at the end side of the driven part of the tool holder so as to form additional drive means for tools with different shaft diameters and with said projection of uniform diameter; a tool tip; and a longitudinal opening extending from said tool tip through the tool shaft for drill and rock particles aspiration and endings in a suction opening in said insertion end in the region of said locking trough.

6. A tool as defined in claim 5, wherein said at least one axial formation is radially outwardly open.

7. A tool as defined in claim 5, wherein said axial formation is formed by two outwardly open drive pockets each having a wedge-shaped cross-section.

8. A tool as defined in claim 7, wherein said drive pockets are located opposite to one another.

9. A tool holder for an arrangement for driving impact and/or drilling tools, having a tool with a tool shaft having grooves which are open to a shaft end, an elongated locking trough in which a locking body is engaged for limiting an axial movement of the tool, and a projection provided on said shaft end of the tool to a thicker portion of said tool shaft with a greater diameter having at least one axial formation, the tool holder comprising a receiving opening for receiving the tool shaft, at least two axially extending drivers projecting inwardly of said receiving opening and engageable in the open grooves of the tool; a radial throughgoing opening which is located in a peripheral region offset relative to said drivers for receiving the locking body; and an axial formation provided at an end side of a driven part of the tool holder and cooperating with said at least one axial formation provided on the projection of the shaft end, said axial formation being axially driveable on said tool holder.

10. A tool holder as defined in claim 9, wherein said axial formation forms additional drive means with the end side axial formation of the projection of the tool and is formed as at least one radially inwardly projecting drive tooth.

11. A tool holder as defined in claim 10, wherein said drive tooth has at least one substantially radially and axially projecting drive flank in a rotary direction.

12. A tool holder as defined in claim 10, and further comprising an actuating sleeve, said at least one drive tooth being displaceable by said actuating sleeve between two arresting positions including one arresting position which determines an engaging position and another arresting position which determines a disengaging position of said at least one drive tooth.

13. A tool holder as defined in claim 12, wherein said actuating sleeve is turnable relative to a tool receptacle of the tool holder between two arresting positions; and further comprising an auxiliary strip which carries said at least one drive tooth so that said actuating sleeve axially displaces said auxiliary strip through a pin guide during turning between said two arresting positions.

14. A tool for an arrangement for driving impact and/or drilling tools with a tool holder having a receiving opening with inwardly projecting and axially extending drivers and at least one radial throughgoing opening located in a peripheral region which is offset relative to the drivers and accommodating a locking body and also provided with at least one axial formation at an end side of a driven part of the tool holder, the tool comprising a tool shaft with grooves open toward a shaft end of the tool for receiving said drivers; an elongated locking trough provided in said tool shaft so that said locking member engages in said locking trough and limits a longitudinal movement of the tool in an axial direction; and a projection located in said shaft which is insertable in the receiving opening and extending to a thicker portion of the tool shaft with a greater diameter so as to cooperate with the axial formation at the end side of the driven part of the tool holder so as to form additional drive means for tools with different shaft diameters and with said projection of uniform diameter, said at least one axial formation is formed as a radially outwardly open drive pocket having a bottom at a constant diameter regardless of the shaft diameter of different tools.

* * * * *